3,260,654
METHOD FOR THE PREPARATION OF A PANCREAS EXTRACT HAVING A HIGH PROTEOLYTIC ACTIVITY

Nazzareno Toccaceli, Milan, Italy, assignor to Ormonoterapia Richter S.p.A., Milan, Italy
No Drawing. Filed Mar. 18, 1964, Ser. No. 352,934
Claims priority, application Italy, Mar. 22, 1963, 5,975/63
18 Claims. (Cl. 195—66)

The present invention relates to the preparation of an extract having a high proteolytic activity, obtained from the pancreas of mammals, particularly cattle, pigs, sheep and equines.

The pancreas of freshly killed animals is known to be free from any noticeable proteolytic activity, since it contains inactive proenzymes only (e.g., trypsinogen, chymotrypsinogen, etc.). These may be activated to enzymes by several methods:

(1) With enterokinase;
(2) With trypsin;
(3) By autolysis.

The first type of activation mentioned (with enterokinase) has the drawback of requiring the preliminary recovery of this enzyme from the intestine or its purchase from other suppliers. The same is true as far as the second type of motivation is concerned (i.e., the use of trypsin as an activator). In our opinion the activation by autolysis (3rd type), once it has been adjusted, is on the contrary the simplest and cheapest method, since it is completely spontaneous. This is why the present invention employs this latter method which, though it is based on a principle known in its general lines, required however a particular study and the adoption of special measures to make it as suitable as possible for the activation of the proteolytic proenzymes contained in the gland.

In order to obtain satisfactory, constant results, particular conditions should be taken into account, such as: (1) temperature; (2) time; and (3) the use of suitable preservatives.

As far as the first and second conditions are concerned, it has been found that pancreas autolysis and the resulting activation take place rapidly at room temperature (24 to 36 hours), and more slowly at 0° C. to +10° C. (36 to 120 hours); when carried out at room temperature, however, the autolysis may give some trouble, such as: (1) a possible putrefactive fermentation, which is difficult to control even when using powerful preservatives; (2) the rapid self-destruction of proteolytic enzymes once activation has taken place; and (3) the difficult extraction of the enzymes themselves.

The autolysis at a lower temperature (0° C. to +10° C.) avoids the first and second drawbacks, makes the extraction less difficult, and the activation more regular. As far as the use of suitable preservative is concerned, quite a number of products had to be considered, and it was found that only a few of them could simultaneously:

(a) Prevent the pancreas from putrefying;
(b) Avoid disturbing its activation; and
(c) Avoid hampering the enzyme extraction and the subsequent operations (concentration and precipitation).

The best results were obtained when using chloroform and toluene, either alone or admixed with each other, and when using thymol.

Satisfactory, though not excellent results were obtained with other preservatives, such as sodium bisulfite, benzyl alcohol, phenol, etc., 10–15% ethyl alcohol, sodium ethylmercurithiosalicylate, tricresol, and other phenolic compounds proved to be less satisfactory.

A proper study was also required in order to select the most suitable activation pH. In fact, at a pH of 7.5 to 8.5 the activation of the zymogens recovered from pancreas is known to occur rapidly when carried out with trypsin or enterokinase; under such conditions, however, trypsinogen is partially converted into an inert protein with a resulting partial loss of activity.

Lowering of pH value to about 4.0 to 5.0 reduces the formation of the inert protein remarkably, and increases the yield in proteolytic activity. On the other hand, the activation of the two proenzymes at a pH of 4.0 to 5.0 appears too slow. Taking all these factors into account, an attempt was made to reach a compromise between process time and activation pH. It was thus possible to find that activation occurred satisfactorily and in a reasonably short time at a pH of about 5.5 to 6.5, or even at the natural pH of pancreas. Even better results were obtained by adding an alkaline earth metal salt, preferably a calcium salt such as a chloride or acetate, to the pancreas, and grinding the gland in a colloid mill to obtain a very finely divided slurry.

The observed improvements are probably due to two reasons:

(a) The cell rupturing on grinding, with the resulting diffusion and better utilization of the activating agents contained within the cells;
(b) The stabilizing effect of the added alkaline earth metal salt.

The fine grinding helps enzyme extraction also, and yields are correspondingly improved.

From what has been indicated above, it is apparent that the autolytic activation method according to the invention is remarkably different from any method described heretofore wherein the individual proenzymes were activated only after they had been isolated; in my case, on the contrary, activation is carried out on the gland in toto, without any preliminary recoverey of the individual proenzymes: the starting material is therefore different, and environmental conditions are completely new.

Throughout study to achieve the best results, I have found that the autolytic activation of pancreas proenzymes is not always completed within the 36 to 120 hours period, and that there is a tendency for the activation to be completed through the subsequent operations, particularly during the concentration of the extract at a pH of 5.0 to 6.5 and a temperature of 20° C. to 30° C. in the presence of alkaline earth metal ions, as disclosed hereinafter.

The pancreas of the most commonly butchered animals (cattle, pigs, equines, etc.) may be processed according to this method, the most suitable types being, however, pig and beef pancreas.

It is important to note that pig pancreas is much richer in proteolytic enzymes than beef pancreas; processing of the latter is, however, easier from a preparative standpoint, because of its lower fat content.

Aqueous extractions of animal organs usually present great difficulties during the filtration step, owing to the presence of a fibrous membrane tending to clog the filters, as in our case.

According to the present invention, these fibrous parts are removed as follows:

(a) A sufficient amount of filtering earth is added to cause the fibers to "coagulate" around the particles of the filtering earth itself; and
(b) The mixture is centrifuged with a basket centrifuge equipped with a 16 to 25 mesh screen rather than with cloth, or is filtered through a basket made with a 16 to 25 mesh screen, with stirring.

When this procedure is used, the inactive fibers are entrapped in the screen, while the active suspension passes through it; as a result, the subsequent filtration of the extract is much easier, the activity loss being negligible.

The addition of the filtering earth in this step is essential, since the separation of the gelatinous fibers is only made possible by their capacity of becoming heavier and "coagulating"; should this not happen, the holes of the screen would immediately become clogged and it would be almost impossible to carry out the filtration.

The method according to the invention may be summarized as follows:

Pancreas is finely ground at first in a blending machine, then in a colloid mill, and an alkaline earth metal salt as a protecting agent (5 to 20 g./kg. of pancreas), and thymol (1 g./kg. of pancreas) dissolved in little ethyl alcohol, or chloroform (3 ml./kg. of pancreas) and toluene (3 ml./kg. of pancreas) as preservatives are added thereto.

The ground mass is then immediately placed in a room kept at a temperature within the range of 0° C. to +10° C. (preferably +5° C.) for a period of about 36 to 120 hours, the main activation of the proenzymes to proteolytic enzymes occurring by autolysis during this period.

The pancreas which has been activated in this way is subjected to an extraction step; two to six volumes, preferably four volumes, of water containing an acid, preferably acetic acid or hydrochloric acid, are added with stirring for this purpose, so that the pH falls to a value within the range of 3.5 to 4.5. The mixture is stirred for 2 hours, and allowed to stand in the cold (0° C. to +5° C.) overnight; the folowing morning the pH is adjusted to a value of 5.0 to 6.5 with an alkaline earth metal hydroxide suspension, preferably calcium hydroxide, which forms the corresponding salt with the acid in the extract, or by adding an alkaline earth metal salt (5 to 10 g./l. of suspension), preferably calcium acetate or calcium chloride, and sodium hydroxide.

The fibrous part is then removed by the addition of filtering earth and subsequent filtration through a 16 to 25 mesh screen; the obtained suspension, which is free or almost free from fibers, is filtered in a plate filter press or centrifuged in a basket centrifuge with the aid of additional filtering earth. The clear or slightly opalescent filtrate contains the proteolytic enzymes. The residue is washed with water having a pH of 5.0 to 6.5 in order to recover a further portion of the enzymes, and is then discarded. The extract may be precipitated immediately by adding a water miscible solvent (e.g., methyl alcohol, ethyl alcohol, acetone, etc.) thereto up to a 70% to 85% concentration, or by salting with a quantity of ammonium sulfate or magnesium sulfate equal to 60 to 90% of that required for saturation.

However, in order to make the process more economical and to obtain higher yields, it is preferred to concentrate the extract in the vacuum at a temperature within the range of +20° C. to +30° C., down to a volume of 700 to 1000 ml. of extract per 1 kg. of pancreas.

The activation of any portion of proenzymes which are still present in the extract is completed during the concentration; the white, inactive precipitate which is formed in the concentration itself is removed by filtration.

The concentrated, filtered extract is treated with any of the above-mentioned precipitants; the precipitate is recovered by filtration and either vacuum or air dried.

The above-described processes may be used to obtain an extract having a high proteolytic activity from the following starting materials other than fresh or frozen pancreas:

(a) Insulin processing residues (where insulin has been extracted from pancreas by means of acidified ethyl alcohol), provided these residues are treated with such an amount of water as to give a suspension containing no more than 20 to 25% of dry residue. It is suggested to bring any ethyl alcohol content down to less than 10%, and to adjust the pH of the suspension to about 5.5 to 6.5;

(b) Powdered pancreas which has not yet been activated, provided it has previously been suspended in water at a 20 to 25% concentration; in order to reduce the activation time, small amounts of an active extract (2 to 5 mg./g.) or of any other activator should in this case be added to such a powder, to start up the activation process;

(c) Activated powdered pancreas. In this case no activation at low temperatures is required, and the extraction may be carried out at once with an amount of water equal to 10–15 times the weight of the powder.

The proteolytic activity of the pancreas extract obtained as above, has been determined by the method of National Formulary, 11th edition, p. 257, 1950 (the obtained values varying from 10 to 20× N.F.), and according to the method of Anson (J. Gen. Physion., vol. 22, p. 19, 1938), which was partially modified and may be summarized as follows:

(a) Digestion of a casein solution of known concentration at a pH of 7.5 and a temperature of +35° C. for 30 minutes;

(b) Precipitation of the undigested casein by the addition of 5% trichloroacetic acid;

(c) Filtration of the suspension and recovery of the filtrate; and (d) Specific determination of the tyrosine released in the digestion step, with the Folin-Ciocalteu reagent.

The "proteolytic unit" (P.U.) is defined as the amount of product which, under the above-mentioned conditions, releases 1 $\mu$g. (microgram) of tyrosine, as calculated spectrophotometrically, after color development with the Folin-Ciocalteu reagent.

According to the latter titration method, the products obtained from pig pancreas according to the present invention have a proteolytic acitivity varying from 3500 to 6500 P.U./mg.; the activity of those obtained from beef pancreas varies from 2200 and 4500 P.U./mg. Activity yield ranges from about 130,000,000 P.U. to about 350,000,000 P.U. per kg. of pancreas. The results are always reproducible, provided the conditions as set in the method have rigorously been observed, and the starting materials (pancreas, insulin processing residue, powdered pancreas, etc.) are of the best quality. Moreover, it is essential that the pancreas comes from healthy animals, and that processing is possibly carried out just after the animal has been butchered.

Excellent results may also be obtained, however, when using a pancreas which has been stored at −18° C. to −30° C. for a period not exceeding six months, as it has been found that longer storage periods may cause a loss in activity.

It is important that pancreas freezing is started not over one hour after the animal has been butchered, in order to prevent any irregular, uncontrolled activation of the proenzymes.

The following examples illustrate my preferred method in more detail, but are not limitative of my invention.

*Example 1*

2,000 kg. of fresh pig pancreas were finely ground in a colloid mill, and homogeneously mixed with 15 g. of calcium acetate and 2 g. of thymol dissolved in 10 ml. of ethyl alcohol. The mixture was kept at a temperature of +4° C. to +5° C. for 3 days for activation, and was then extracted by adding 8.0 l. of an H/5 solution of acetic acid to the suspension; in such a way the pH of the suspension fell to 3.9. The mixture is then stirred for 2 hours, and allowed to stand at a temperature of +4° C. to +5° C. overnight in order to complete the extraction of the enzymes. The following day the pH was adjusted to 6.0 by means of an aqueous suspension of calcium hydroxide, 500 g. of a filtering earth were added, and the fibrous portion was removed by filtration through an 18 mesh screen with stirring.

The fibers were washed with 500 ml. of water and discarded; washings were added to the main suspension.

The mixture was treated with further 800 g. of filtering earth, and filtered on a plate filter press, leading to a slightly opalescent extract, of a light yellow color. The filtrate (4.9 l.) was concentrated at a temperature of 25° C. to 28° C. in a suitable vacuum concentrator down to a volume of 1.8 l. The concentrated, turbid extract was filtered on filter paper with a pump, and treated with 14 l. of 95% ethyl alcohol. A heavy white precipitate was obtained which, after it had been standing for a few hours, was collected by centrifugation, washed with 95% ethyl alcohol twice (500 cc. each time), and finally dried in the vacuum.

Weight yield: 123 g., corresponding to 61.5 g./kg. of fresh pancreas.

Titre:
(a) according to the National Formulary method (11th Edition, p. 257, 1960)—17×N.F.
(b) according to the Anson method modified as illustrated above: 4880 P.U./mg.

Activity yield: 300,000,000 P.U./kg. of fresh pancreas.

Example 2

50 kg. of frozen pig pancreas were finely ground in a colloid mill and homogeneously mixed with 50 g. of thymol dissolved in 200 ml. of ethyl alcohol, and 300 g. of calcium chloride. The ground mass was placed into a room kept at a temperature of +3° C. to +5° C., where it was kept for 3 days. After activation had occurred, the mass was suspended in 200 l. of water, and 5 N hydrochloric acid was added with stirring until a pH of 4.0 was reached. The mixture was stirred for 2 hours, and allowed to stand in the cold (+3° C. to +5° C.) overnight to complete enzyme extraction. The following day the pH was adjusted to 6.0 by adding 1.5 kg. of bihydrated calcium chloride and the required amount of 40% NaOH with stirring; 10 kg. of filtering earth were added and the fibrous portion was removed through a 16 mesh screen with stirring.

The fibers were washed with 40 to 50 l. of water and discarded, while the washings were added to the main suspension.

The latter was mixed with another 30 kg. of filtering earth, and filtered in a plate filter press; a slightly opalescent solution (455 l.) was obtained, a small portion of which (510 ml.) was treated with 4.0 l. of 95% ethyl alcohol; after it had been standing overnight, the precipitate was collected and dried (product A). The remaining solution was vacuum concentrated at a temperature of less than +30° C., down to a volume of 48 l. The turbid concentrate was filtered in a plate filter press in the presence of 200 g. of filtering earth, and was then treated with 420 l. of 95% ethyl alcohol. The heavy precipitate was allowed to stand overnight and collected in a suitable basket centrifuge, washed with 95% ethyl alcohol, and vacuum dried at a temperature within the range of +25° C. to +30° C. (product B).

Yields:
Product A=5.6 g., corresponding to 56 g./kg. of pancreas.
Product B=3.5 kg., corresponding to 70 g./kg. of pancreas.

Titres of proteolytic activity:
(a) According to the National Formulary (11th Edition, p. 257, 1960) method—
Product A=16×N.F.
Product B=15×N.F.
(b) According to the Anson method modified as described above—
Product A=4200 P.U./mg.
Product B=3800 P.U./mg.

Yields in proteolytic activity:
Product A: 235,000,000 P.U./kg. of pancreas.
Product B: 266,000,000 P.U./kg. of pancreas.

These values show that not only the precipitation of the enzymes can be carried out with or without a preliminary concentration of the extract, but that the latter operation may sometimes improve the yield.

Example 3

100 kg. of frozen beef pancreas were finely ground at first in a meat-chopper and in a colloid mill, and were mixed with 600 g. of bihydrated calcium chloride, and with toluene (300 cc.) and chloroform (300 cc.).

The whole processing was carried out in a similar way as described in Example 1, using amounts of water, reagents, filtering earth and alcohol proportioned to the initial quantity of pancreas.

Weight yield: 5.2 kg., corresponding to 52 g./kg. of pancreas.

Titre:
(a) According to the National Formulary (11th Edition, p. 257, 1960) method: 14×N.F.
(b) According to the Anson method modified as described above: 3200 P.U./mg.

Yield in proteolytic activity: 172,000,000 P.U./kg. of pancreas.

Example 4

20 kg. of fresh beef pancreas were finely ground as in Example 3 and mixed with 20 g. of thymol and 150 g. of bihydrated calcium chloride, and were then acivated and extracted in the same way as in Example 1, up to the point where the extract is concentrated. After a vacuum concentration, the extract was mixed with an amount of ammonium sulfate sufficient to give a 70% saturation, with stirring. The mixture was allowed to stand at room temperature overnight, and was then filtered with a pump. The precipitate was dried as much as possible while on the filter, by suction, and was then dried completely in the vacuum and ground.

Weight yield: 1.42 kg., corresponding to 71 g./kg. of pancreas.

Titre:
(a) According to the National Formulary (11th Edition, p. 257, 1960) method: 10×N.F.
(b) According to the Anson method, modified as described above: 2200 P.U./mg.

Yield in proteolytic activity: 156,000,000 P.U./mg.

Example 5

20 kg. of powdered active pancreas (titre=6 N.F.), corresponding to 130 kg. of fresh pancreas, were suspended in 200 l. of water containing 1 kg. of bihydrated calcium chloride. The pH of the suspension was adjusted to 4.0 with hydrochloric acid. The mixture was homogeneously ground in a blender and in a colloid mill, and stirred at room temperature for 3 hours, and was then allowed to stand overnight in the cold (0° C. to 5° C.) at a pH of 4.0. The pH of the suspension was adjusted to 6.0 with 20% NaOH the following day, and the suspension was filtered in a plate filter press in the presence of 10 kg. of filtering earth. The clear filtrate was concentrated in the vacuum at a temperature of +30° C. down to a volume of 95 l., filtered again in the presence of little filtering earth (100 g.), and treated with 800 l. of 95% ethyl alcohol. A heavy precipitate was immediately formed, which settled rapidly. After a few hours the supernatant almost clear liquid was siphoned off, and the precipitate was collected by centrifugation, washed with 10 l. of 95% ethyl alcohol twice, and then dried in the vacuum.

Weight yield: 6.0 kg., corresponding to 30% of the original powdered pancreas, or to 46 g./kg. of fresh pancreas.

Titre:
(a) According to the National Formulary (11th Edition, p. 257, 1960) method: 16×N.F.
(b) According to the Anson method, modified as described above: 4700 P.U./mg.

Yield in proteolytic activity: 216,000,000 P.U./kg. of fresh pancreas.

Example 6

29 kg. of powdered pancreas which had not been activated, correspond to 150 kg. of fresh pig pancreas, were suspended in 120 l. of water containing 800 g. of bihydrated calcium chloride and 150 g. of thymol, and blended in a colloid mill. The very fine suspension was mixed with 50 g. of an active pancreas extract, which had been previously prepared as described in Example 1, this step being solely made in order to start up the activation reaction; the pH was then adjusted to 6.0.

The mixture was allowed to stand at 0° C. to 5° C. for 34 hours, and 600 l. of water and a sufficient amount of acetic acid to give a pH of 4.0 were then added. The suspension was then stirred for 2 hours and allowed to stand at 5° C. overnight, and was then mixed with 4 kg. of calcium acetate, and the pH was adjusted to 5.8 with sodium hydroxide.

The mixture was then immediately filtered in a plate filter press, and the filtrate was concentrated in the vacuum at a temperature of about 30° C. until a volume of 130 l. was reached.

The concentrated extract was filtered in order to remove the precipitate which had been formed during the concentration step, and was then mixed with 1000 l. of 95% alcohol. A heavy precipitate was formed which, after standing overnight, was collected by filtration, washed with 95% ethyl alcohol, and dried in the vacuum.

Weight yield: 8.5 kg., corresponding to 29.3% of the original powder, or to 56.6 g./kg. of fresh pancreas.
Titre:
  (a) According to the National Formulary (11th Edition, p. 257, 1960) method: 18×N.F.
  (b) According to the Anson method, modified as described above: 5000 P.U./mg.
Yield in proteolytic activity: 283,000,000, P.U./kg. of fresh pancreas.

Example 7

8.2 kg. of beef pancreas residues, derived from insulin extraction, corresponding to 20 kg. of fresh pancreas, were suspended in 12 l. of water containing 0.120 kg. of bihydrated calcium chloride and 20 g. of thymol, and blended in a colloid mill. The pH of the suspension was adjusted to 6.0 with a sodium hydroxide solution. The suspension was allowed to stand at about 5° C. for three days for activation, and was then diluted with 80 l. of water containing 450 g. of calcium acetate, while its pH was adjusted to 4 with acetic acid.

The suspension was stirred for 4 hours, allowed to stand at about 5° C. overnight, its pH was adjusted to 6.0, and the suspension was then mixed with 5 kg. of filtering earth and filtered through a basket made with an 18 mesh screen in order to remove the fibers; it was then mixed with further 8 kg. of filtering earth and filtered in a plate filter press.

The extract was concentrated in the vacuum at about 30° C. until a volume of 15 l. was reached, filtered and added with 130 l. of 95% ethyl alcohol.

The precipitate was collected by filtration, washed with 95% ethyl alcohol and dried in the vacuum.

Weight yield: 1.020 kg. corresponding to 51 g./kg. of fresh pancreas.
Titre:
  (a) According to the National Formulary (11th Edition, p. 257, 1960) method: 15×N.F.
  (b) According to the Anson method, modified as described above: 3820 P.U./mg.
Yield in proteolytic activity: 194,000,000 P.U./kg. of fresh pancreas.

The filtering earth used in Examples 1 and 2 is "Hyflo Super Cel" (Johns-Manville), the filtering earth used in Examples 3, 4 and 5 is "Celite" and the filtering earth used in Examples 6 and 7 is "Perlite."

I claim:
1. A process for the preparation of an extract having high proteolytic activity from a mammal pancreas, comprising:
  (a) activating said pancreas through autolysis at a pH from about 5.5 to about 6.5 and a temperature from about 0° C. to about +10° C. in the presence of a preservative selected from the group consisting of thymol, toluene, chloroform, sodium bisulfite, benzyl alcohol phenol, and mixtures thereof;
  (b) extracting proteolytic enzymes with water at a pH from about 3.5 to about 4.5, from the product formed in (a);
  (c) removing fibrous matter from the product formed in (b);
  (d) precipitating enzymes present in the substantially fibrous-free product obtained in (c); and
  (e) vacuum drying the precipitate obtained in (d) at a temperature of less than about +30° C.

2. The process defined by claim 1 wherein the pancreas is finely divided before it is activated in (a).

3. The process defined in claim 1 wherein the pancreas is selected from fresh and frozen pancreas of mammals, insulin residues of mammal pancreas and not yet activated pancreas of mammals.

4. The process defined by claim 1 wherein autolysis in (a) is effected in the presence of an alkaline earth metal salt.

5. The process defined by claim 1 wherein in (c) a filtering earth is added to the product formed in (b) and the resulting association of fibrous matter and filtering earth is removed from the product so formed, before (d).

6. The process defined by claim 5 wherein the substantially fibrous-free product of (c) is filtered in the presence of a filtering earth and a water-soluble alkaline earth metal salt at a pH from about 5.0 to about 6.5.

7. The process defined by claim 1 wherein the filtrate obtained in (d) is concentrated under vacuum whereby activation is substantially completed, before (e).

8. The process defined by claim 1 wherein the pancreas comprises an insulin residue of mammal pancreas which is treated with a quantity of water sufficient to provide from about 20 to about 25 percent by volume of solids, before (a).

9. A process for the preparation of an extract having a high proteolytic activity from a mammal pancreas selected from fresh, frozen and powdered pancreas, comprising:
  (a) finely dividing the pancreas thereby quantitatively releasing material capable of activating proenzymes therein;
  (b) activating said pancreas through autolysis at a pH from about 5.5 to about 6.5 and at a temperature from about 0° C. to about +10° C., in the presence of an alkaline earth metal salt and a preservative selected from thymol, toluene, chloroform, sodium bisulfite, benzyl alcohol and phenol, and mixtures thereof;
  (c) extracting proteolytic enzymes with water at a pH from about 3.5 to about 4.5 from the product formed in (b);
  (d) adding a filtering earth to the product formed in (c) and thereby remove fibrous matter therefrom;
  (e) filtering the substantially fibrous-free product of (d) in the presence of a filtering earth and an alkaline earth metal salt, at a pH from about 5.0 to about 6.5;
  (f) precipitating enzymes present in the product obtained in (e); and
  (g) vacuum drying the precipitate obtained in (f) at a temperature of less than about +30° C.

10. The process defined by claim 9 wherein the filtrate obtained in (e) is concentrated under vacuum whereby activation is substantially completed, before (f).

11. A process for preparing extracts having a high proteolytic activity from a powdered mammal pancreas which has not yet been activated, comprising:
(a) suspending said powder in water up to a concentration of from about 20% to about 25% by volume of dry material;
(b) finely dividing the suspension formed in (a);
(c) adding to the product formed in (b) a small quantity of an active pancreas extract;
(d) extracting proteolytic enzymes with water at a pH from about 3.5 to about 4.5, from the product formed in (c);
(e) removing the fibrous matter from the product formed in (d);
(f) precipitating enzymes present in the substantially fibrous-free product obtained in (e); and
(g) vacuum drying the precipitate obtained in (f) at a temperature of less than about +30° C.

12. The process defined by claim 11 wherein in (e) a filtering earth is added to the product formed in (d) and the resulting association of fibrous matter and filtering earth is removed from the product so formed, before (f).

13. The process defined by claim 12 wherein the substantially fibrous-free product of (e) is filtered in the presence of a filtering earth and a water-soluble alkaline earth metal salt at a pH from about 5.0 to about 6.5.

14. The process defined by claim 13 wherein the filtrate obtained is concentrated under vacuum whereby activation is substantially completed.

15. A process for preparing extracts having a high proteolytic activity from an activated, powdered, mammal pancreas comprising:
(a) suspending said powder in water at a pH from about 3.5 to about 4.5;
(b) removing fibrous matter from the product formed in (a);
(c) precipitating enzymes present in the substantially fibrous-free product obtained in (b); and
(d) vacuum drying the precipitate obtained in (c) at a temperature of less than about +30° C.

16. The process defined by claim 15 wherein in (b) a filtering earth is added to the product formed in (a) and the resulting association of fibrous matter and filtering earth is removed from the product so formed, before (c).

17. The process defined by claim 16 wherein the substantially fibrous-free product of (b) is filtered in the presence of a filtering earth at a pH from about 5.0 to about 6.5.

18. The process defined by claim 17 wherein the filtrate obtained is concentrated under vacuum whereby activation is substantially completed, before (c).

References Cited by the Examiner

UNITED STATES PATENTS 2,751,329   6/1956   Maxwell et al. _____ 195—66

A. LOUIS MONACELL, *Primary Examiner.*

L. M. SHAPIRO, *Assistant Examiner.*

UNITED STATES PATENT OFFICE
CERTIFICATE OF CORRECTION

Patent No. 3,260,654                                      July 12, 1966

Nazzareno Toccaceli

It is hereby certified that error appears in the above numbered patent requiring correction and that the said Letters Patent should read as corrected below.

Column 4, line 62, for "H/5" read -- M/5 --.

Signed and sealed this 5th day of September 1967.

(SEAL)
Attest:

ERNEST W. SWIDER
Attesting Officer

EDWARD J. BRENNER
Commissioner of Patents